June 20, 1967 E. STEMME 3,326,437

DEVICE FOR THE STEPWISE FEED OF BAND-SHAPED RECORD SUPPORTS

Filed April 16, 1965 2 Sheets-Sheet 1

INVENTOR.
ERIK STEMME

BY Darby + Darby

ATTORNEYS

DEVICE FOR THE STEPWISE FEED OF BAND-SHAPED RECORD SUPPORTS

Filed April 16, 1965

INVENTOR.
ERIK STEMME
BY
Darby & Darby
ATTORNEYS

United States Patent Office 3,326,437

Patented June 20, 1967

3,326,437

DEVICE FOR THE STEPWISE FEED OF BAND-SHAPED RECORD SUPPORTS

Erik Stemme, Nasbypark, Sweden, assignor to Aktiebolaget Atvidabergs Industrier, Atvidaberg, Sweden, a Swedish joint-stock company Filed Apr. 16, 1965, Ser. No. 448,663
4 Claims. (Cl. 226—113)

The present invention relates to a device for the stepwise feed of band-shaped record supports, particularly magnetic tapes.

Magnetic tapes are widely in use as supports for input and output data in modern data processing computers. Heretofore, it has not been possible to transfer the primary data produced in normal office routine work, such as order and invoicing information, directly to magnetic tapes for direct processing in a computer. Instead, the primary data is recorded on punched cards or punched tape whereafter it is transferred to magnetic tapes in special machines.

It was previously proposed, for example in French patent specification 1,219,467, to record primary data directly on magnetic tape with the help of a recording apparatus by a stepwise feed of the magnetic tape. In view of the high storage density on magnetic tapes of the magnitude 10 symbols/mm. the stopping mechanism has to satisfy extremely high requirements. The above mentioned French patent specification shows an arrangement to attain this object wherein a magnetic tape is directed from a storing coil to a winding coil in a straight course below two holding members and a deflecting member placed therebetween. The stepping is effected in that the clamp or holding member located closest to the winding coil retains the tape whereafter the deflecting member deflects the originally straight tape to form a curve corresponding in size to the length of the desired step. The tape required for forming said curve is taken from the store coil. In the subsequent moment the second holding member clamps the tape, at the same time as the first holding member and the deflecting member return to non-operative position. The winding coil, however, which is driven by a suitable friction clutch straightens the curved portion of the tape, thereby causing the tape to move a distance corresponding to the curve.

When using the aforesaid arrangement, it has proved difficult under certain circumstances to maintain the feeding constant, due to the fact, that the tape which lies in a plane when the deflecting member is in non-operative position is not sufficiently stiff but may flutter to the sides. As a result of this fluttering tendency the length of the advanced tape can vary from one movement of the deflecting member to the other.

The present invention relates to a device adapted for the stepwise feed of a web-shaped record support, which device is arranged between a store coil and a winding coil and comprises two clamping members operating alternately against tape guides and a reciprocating feeder disposed between said clamping members to operate at a right angle to the tape, which feeder advances the tape from the store coil by curving the tape when the first clamping member closest to the store coil is in non-operative position, and returns to a starting position when the first clamping member again is made operative and the second clamping member is made non-operative, thereby reducing the curve of the tape by the traction effect from the winding coil. The invention is characterized in that the feeder already in its starting position maintains the tape portion located between the clamping members in curved relationship to a plane through the clamping surfaces of the tape guides.

The invention is described in a greater detail in the following, reference being had to the accompanying drawings in which.

Figure 1:
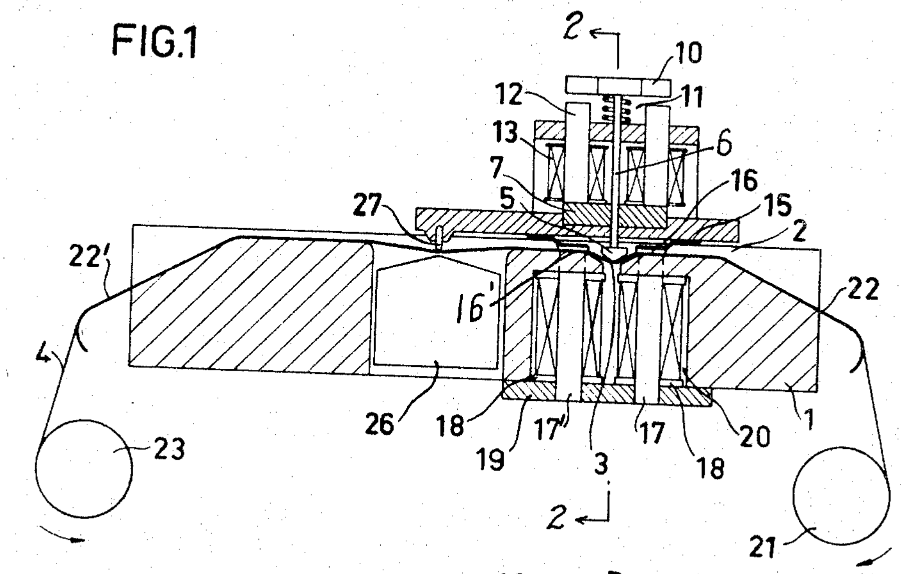
FIG. 1 is a view which shows a partially sectioned horizontal projection.
Figure 2:
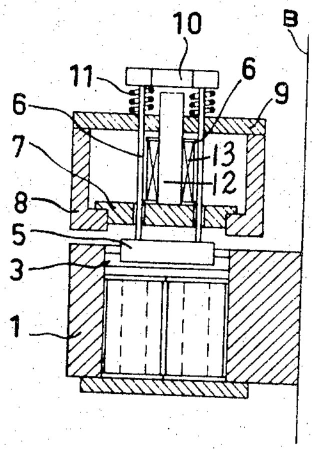
FIG. 2 is a view which shows a section along the cut A—A of a feeder according to the invention taken on the plane of the line 2—2 of FIG. 1.

In FIGS. 1 and 2 which show only such details as are essential for the invention, 1 designates a stand secured on a plate or support B. The stand B is provided with a longitudinal groove 2 serving as a guide groove for the tape. Across the tape guide 2 extends a groove 3 into which the tape 4 may curve.

Directly opposite the groove 3 a feeder 5 is supported in a housing 8, in such a manner, that it can move at a right angle to the plane of the magnetic tape. The housing 8 can be displaced from the position shown by guides not shown in order to render possible the insertion of the tape.

The feeder 5 is secured to two guides 6 mounted in the plate 7 and in the rear wall 9 of the housing 8. The rear ends of the guides 6 are secured in an armature 10 of magnectic material. Between the armature 10 and the wall 9 compression springs 11 are mounted which in non-operative position maintain the armature in its upper position defined by a stop means not shown. Said stop means is mounted on the housing 8 and preferably provided with a set screw allowing the movement of the armature and thereby the feed per step to be varied. The armature 10 is actuated by the magnet coils 12 which are provided with windings 13. The poles are mounted in the plate 7 of magnetic material.

Figure 3:
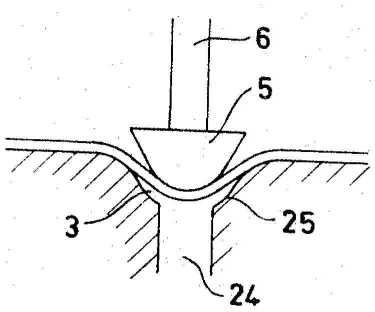
FIG. 3 is a view which shows the feeder and adjacent portions on an enlarged scale.

On the lower wall of the housing 8, as seen in FIGURE 2, two leaf springs 15 are mounted, each of them carrying a lock head 16, 16' of magnetic material. The lower wall also carries a means 27 for holding down the tape. Each of the lock heads 16, 16' cooperates with its magnet 17, 17' provided with windings 18, 18'. The magnets 17, 17' are mounted on a plate 19 of magnetic material which is secured to the stand. The magnets 17, 17' are located in a recess 20 in the stand 1, in such a manner, that their poles extend to the plane of the tape guide groove 2 directly adjacent the lock heads 16, 16' in the immediate neighbourhood of the transverse groove 3. The springs 15 are prestressed for holding the air gap between the heads 16, 16' and the magnet poles as small as possible even when the magnets are not operative. The magnectic tape 4 is directed from a store coil 21 via a spring 22 adapted to compensate for the jerk in the tape, and into the tape guide groove 2. The tape is then directed below the lock head 16, past the feeder 5, the lock head 16' and beneath the hold down means 27 located directly above a magnetic recording head 26 whereafter the tape leaves the tape guide via a second compensating spring and is wound on a second coil 23. The coils 21 and 23 are driven each in its direction by a common or by separate motors. FIG. 3 shows on an enlarged scale the shape of the groove 3 into which the tape is deflected by the feeder 5. The flanks 25 of the groove are given a profile substantially concurring with the curve which the tape assumes when it is subjected to the action of the feeder 5 and the traction forces in the tape from the coils 21 and 23. In this way, the formation of uncontrolled curves having no contact with the tape guide is eliminated. It is to be observed that the feeder 5 already in its non-operative position curves the tape into the groove 3. This includes the advantage that the tape runs in a path which is much better defined than if the feeder on its return to non-operative position would get out of contact with the tape. The groove 3 has in its bottom an opening 24 which prevents the formation of an air cushion behind the tape and affects the feeding.

Figure 4:
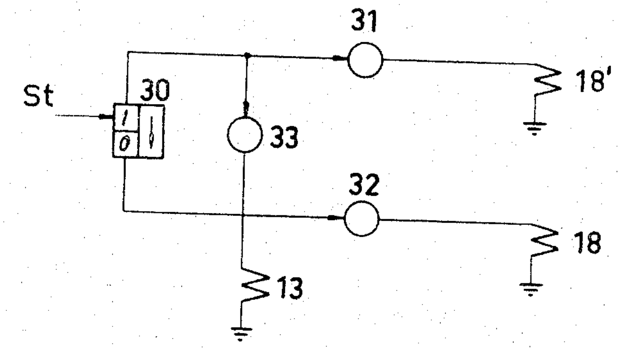
FIG. 4 is a block diagram for the operating circuits.
Figure 5:
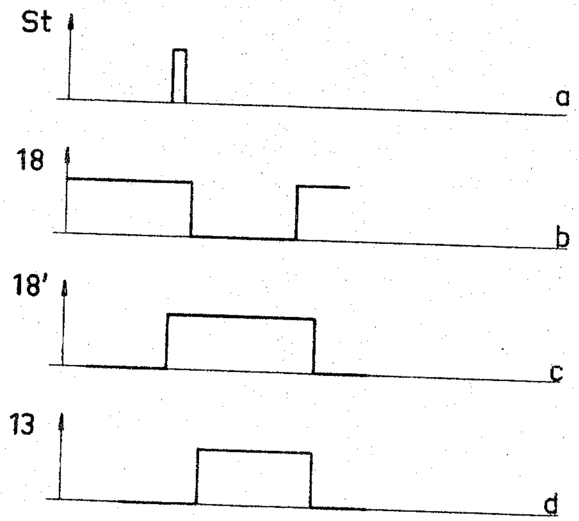
FIG. 5 is an impulse diagram.

In FIG. 4 *St* designates an impulse arriving from the outside (FIG. 5*a*) and starting a stepping operation. The said impulse triggers a monostable flip-flop 30 which via amplifying and impulse-shaped circuits 31, 32, 33 actuates the magnets 13, 18 and 18'. As soon as the flip-flop 30 is triggered, the locking magnet 18' attracts, which ocurs rapidly because of the small air gap between the lock head 16 continuously abutting the tape and the poles 17 (FIGS. 2 and 5*a*). Immediately thereafter the brake magnet 18 (FIG. 5*b*) drops and releases the tape on the uncoiling side. The magnet 12 attracts the armature 10 (FIG. 5*d*) and advances the feeder 5 such, that the curvature of the tape in the gap 25 increases. The tape length required for this curvature is taken from the coil 21 against the drive action on the coil. Upon the return of the flip-flop 30 to non-operative position, the brake magnet 18 attracts whereafter the feeder 5 returns to its non-operative position by action of the spring 11, and the locking magnet 18' drops. The winding coil 23 tightens the tape, so that the loop formed by the feeder 5 is reduced in size.

By switching the connections to the magnet coils 18 and 18', the direction of motion of the tape can be changed in an easy manner, for example in order to return and correct a recording on the tape.

What I claim is:

1. A device for the step-wise feeding of a web-shaped record support between a store coil and a winding coil, comprising, in combination, a record support guide having a substantially plane surface, a groove extending transversely of said guide, a first clamping member adapted to clamp the record support web against said guide on the side of said groove nearest the store coil, a second clamping member adapted to clamp the record support web to said guide on the side of said groove nearest the winding coil, a reciprocating feeder disposed betweeen said first and second clamping members, said feeder extending transversely of said record support web in substantially vertical alignment with the center of said groove, electro-magnetic means for operating said feeder, electro-magnetic means for operating said clamping members individually, and circuit means for energizing said electro-magnetic means for said second clamping member and said electro-magnetic means for said feeder to cause record support web to be drawn from said store coil into said groove by said feeder and for thereafter energizing said electro-magnetic means for said first clamping member and de-energizing said feeder magnetic means and said second clamping member magnetic means thereby causing said record support to be drawn from said groove under tension exerted by the winding coil, said record support remaining in contact with said feeder at all times.

2. A device as claimed in claim 1 wherein said circuit means comprises a mono-stable flip-flop, said flip-flop causing said electromagnetic means for said first clamping member to be normally energized and said second clamping member magnetic means to be de-energized, said first clamping member magnetic means de-energized and said feeding magnet energized sequentially following receipt of starting pulse, said first clamping member magnetic means being thereafter de-energized followed by simultaneous de-energization of said first clamping member magnetic means and said feeder magnetic means as said flip-flop returns to its stable state after a predetermined time interval.

3. A device as claimed in claim 1 wherein said transverse groove is provided with flanks conforming to the natural curvature of said record support web when in contact with said feeder and under tension from the store and winding coils.

4. A device in accordance with claim 1 wherein said clamping members are made of magnetic material and are resiliently pressed against the record support and wherein said electromagnetic means for said clamping members comprise magnets located beneath said record support web guides and having poles substantially in the plane of said guides to draw said clamping members against said record support web and clamp it against said guide surface.

References Cited

UNITED STATES PATENTS

| | | | |
|---|---|---|---|
| 2,858,131 | 10/1958 | Leshner | 226—120 |
| 2,997,637 | 8/1961 | Bowditch | 226—113 X |

STANLEY N. GILREATH, *Primary Examiner.*

LEONARD D. CHRISTIAN, *Examiner.*